G. B. KINSLER.
BELT FASTENER.
APPLICATION FILED JUNE 30, 1917.

1,249,419. Patented Dec. 11, 1917.

Inventor
George B. Kinsler
By Heath Sutherland
Attorney

UNITED STATES PATENT OFFICE.

GEORGE B. KINSLER, OF HARTFORD, CONNECTICUT, ASSIGNOR OF ONE-HALF TO JARVIS McA. JOHNSON, OF HARTFORD, CONNECTICUT.

BELT-FASTENER.

1,249,419.  Specification of Letters Patent.  Patented Dec. 11, 1917.

Application filed June 30, 1917. Serial No. 177,864.

*To all whom it may concern:*

Be it known that I, GEORGE B. KINSLER, a citizen of the United States, residing at Hartford in the county of Hartford and State of Connecticut, have invented certain new and useful Improvements in Belt-Fasteners, of which the following is a specification.

This invention relates to belt-fasteners. While a belt-fastener involving the invention is as may be inferred, susceptible of general use, it is of particular utility for uniting the ends of a belt of fabric, as distinguished from leather or similar material. One of the primary objects of the invention is the provision of an article of the character set forth which can be easily and quickly applied to the ends of a belt and which when in operative relation will effectually prevent said ends from accidentally separating or opening.

In the drawings accompanying and forming part of the present specification I have shown in detail one convenient form of embodiment of the invention which to enable those skilled in the art to practice the same will be set forth fully in the following description. I do not limit myself to this particular showing, however; I may depart therefrom in several respects within the scope of the invention defined by the claims following said description.

Referring to said drawings.

Like characters refer to like parts throughout the several views.

The belt-fastener involves in its make-up a plurality of longitudinally flexible elements flexibly connected together, the respective elements being connected longitudinally in some desirable manner, to the end portions of a belt. The necessary flexibility between the elements can be obtained in various ways, best, however, by a hinge or pivoted joint. In like manner the longitudinal flexibility of the elements can be secured in different manners, most desirably, however, by a succession of units pivoted together.

Figure 1:
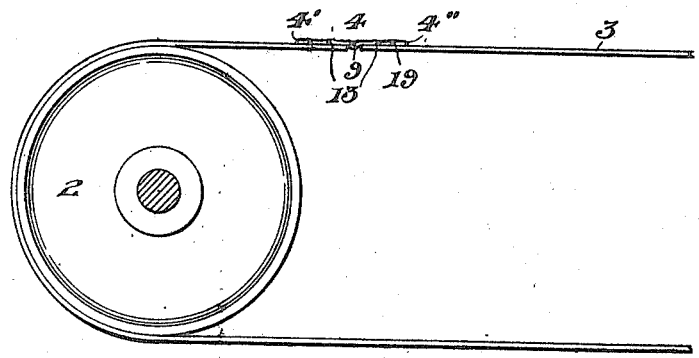
Figure 1 is an elevation of a pulley and belt thereon, partially represented, and the ends of which are connected by a fastener involving the invention.
Figure 2:
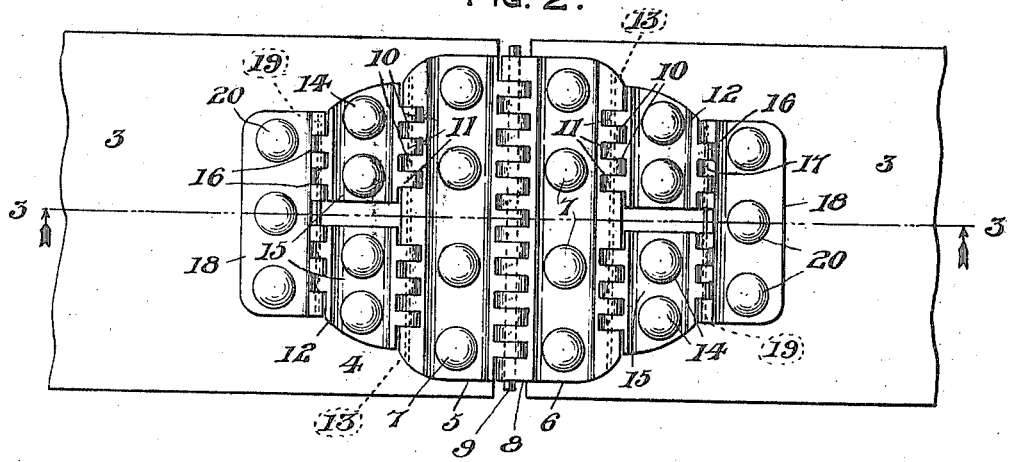
Fig. 2 is a top plan view of the outside surface of the belt at the joint with the fastener in place.
Figure 3:
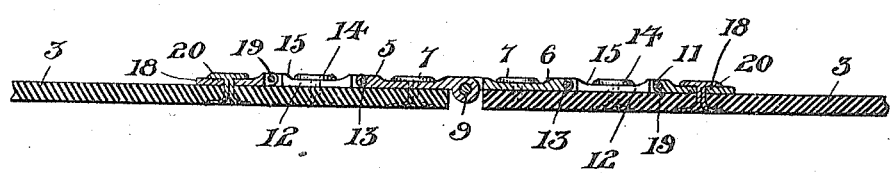
Fig. 3 is a longitudinal section on the line 3—3 of Fig. 2, looking in the direction of the arrows.

As I have already observed, the fastener is susceptible of general use in the power transmission and analogous arts, although it is of peculiar adaptability, however, to a belt of fabric, such as cloth. In Fig. 1 I have shown a pulley or band wheel 2 and a belt 3, the belt being the same as that partly appearing in Figs. 2 and 3. The ends of the belt are united by a fastener such as that denoted in a general way by 4. This fastener as will hereinafter appear comprises metallic elements as 4' and 4" comprising respectively units as 5 and 6. These units may be united to the outer faces of the belt 3 near the ends thereof in any desirable manner, the rivets 7 serving quite satisfactorily in this particular, there being a row of such rivets in connection with each unit or plate. The units or plates 5 and 6 fit flatwise against the belt 3, near the ends thereof, the heads of the rivets engaging the convex or depressed surfaces of said units or plates. The said units or plates 5 and 6 are provided at their outer edges with projections 8 which are interfitted and which are transversely perforated to receive the pin or pivot 9, the ends of which may be, if desired, headed over or otherwise held against accidental displacement. The main units or plates 5 and 6 in addition to the projections 8 at their forward ends have projections 10 at their rear ends, the spaces between the projections being adapted to receive similar projections as 11 extending forwardly from the two pairs of companion plates 12, fitted flatwise to the outer face of the belt 3 and laterally respectively separated from each other. The two pairs of plates 12 are connected to the plates 5 and 6 by the union of the respective projections 10 and 11 by pins as 13. The auxiliary plates or units 12 may be united to the outer surface of the belt 3 by rivets 14 which in the present case are counterparts of the rivets 7, the rivets 14 fitting in channels or concavities 15 in the upper or outer surfaces of the plates 12. As shown the plates 12 have projections 16 which enter spaces between projections 17 at the forward edge of plates as 18, the plates 18 being united with the respective pairs of plates 12 by pins as 19 extending through the respective projections 16 and 17. These plates 18 are united with the belt 3 by rivets 20 which fit the upper or outer concaved surfaces of the units or plates 18 which as will be understood fit flatwise as do the other plates, against the outer face of the belt. These rivets 20 are also like the other rivets, clenched through the belt.

The units or plates are not only substantially connected to the belt, but they reinforce it and are prevented from accidentally being separated therefrom. They affect, however, in no wise the proper transmission of power, nor do they interfere with the transmission qualities of the belt. At the same time they offer practically no protrusions. The rivets are clenched or headed over the inner surface of the belt so as to be practically flush or in a plane with said inner surface and thus do not interfere with the proper transmission qualities of the belt.

What I claim is:

1. A belt fastener comprising two plates having teeth which interfit and which are pivoted together, the plates having sets of teeth at their outer edges, plates having teeth fitted between the outer teeth of the other plates and pivoted thereto, plates having teeth which are fitted between the teeth of the second series of plates and are pivoted thereto, and rivets for uniting the respective plates to the ends of a belt.

2. A belt fastener comprising two plates having teeth on their inner edges which interfit, a pin extending through the two series of teeth, the plates having sets of teeth on their outer edges, plates arranged in pairs, having teeth fitted between the outer teeth of the other plates, pivot pins extending through the last mentioned series of teeth, the pairs of plates having teeth on their outer edges, plates having teeth on their inner edges disposed between the last mentioned series of teeth, pivot pins extending through the last mentioned series of teeth, and means for connecting the several plates to the ends of a belt.

3. A belt fastener comprising two plates having teeth on their inner edges which interfit, a pin extending through the two series of teeth, the plates having sets of teeth on their outer edges, plates arranged in pairs, having teeth fitted between the outer teeth of the other plates, pivot pins extending through the last mentioned series of teeth, the pairs of plates having teeth on their outer edges, plates having teeth on their inner edges disposed between the last mentioned series of teeth, pivot pins extending through the last mentioned series of teeth, and rivets for uniting the respective plates to the ends of a belt, the rivets extending through the bodies of the plates and the bodies of the plates being disposed below the toothed portions thereof.

In testimony whereof I affix my signature in the presence of two witnesses.

GEORGE B. KINSLER.

Witnesses:
L. L. MARKEL,
HEATH SUTHERLAND.

Copies of this patent may be obtained for five cents each, by addressing the "Commissioner of Patents, Washington, D. C."